United States Patent [19]

Poorman

[11] Patent Number: 5,724,747

[45] Date of Patent: Mar. 10, 1998

[54] BRICK MASON'S SPACING TAPE

[76] Inventor: Jeffrey Poorman, 190 N. 300 W., Springville, Utah 84663

[21] Appl. No.: 632,000

[22] Filed: Apr. 15, 1996

[51] Int. Cl.$^6$ .................................................. G01B 3/02
[52] U.S. Cl. ............................................. 33/759; 33/494
[58] Field of Search ............................. 33/759, 483, 494, 33/755, 679.1

[56] References Cited

U.S. PATENT DOCUMENTS

| | | | |
|---|---|---|---|
| 1,594,862 | 8/1926 | Unverferth | 33/494 |
| 1,677,821 | 7/1928 | Graham | 33/494 |
| 2,904,891 | 9/1959 | Cook | 33/494 |
| 3,210,850 | 10/1965 | Grazyb | 33/759 |
| 4,970,797 | 11/1990 | Sarasin | 33/494 |
| 5,335,421 | 8/1994 | Jones, Jr. | 33/759 |
| 5,519,943 | 5/1996 | Snyder | 33/759 |

*Primary Examiner*—Christopher W. Fulton

[57] ABSTRACT

A brick mason's spacing tape adapted for use in association with bricks and mortar, the apparatus comprising: a measuring tape formed in a planar configuration with an upper surface having a first edge and a second edge, the first edge including numerical incremental line markers spaced 1/16 of an inch from each other and inch demarcating numerals positioned at each one inch interval; and the second edge of the tape including at least two groups of lettered incremental line markers positioned at consistent intervals on the tape and repeating about every six inches, a first group of lettered markers being spaced 1/16 of an inch from each other, and positioned in alignment with the numerical incremental line markers of the first edge of the tape, the second group of lettered markers being spaced 1/8 of an inch from each other and in alignment with every second numerical incremental line marker of the first edge of the tape, a user positioning the tape against a brick wall to aid in vertically or horizontally aligning bricks to be laid.

1 Claim, 2 Drawing Sheets

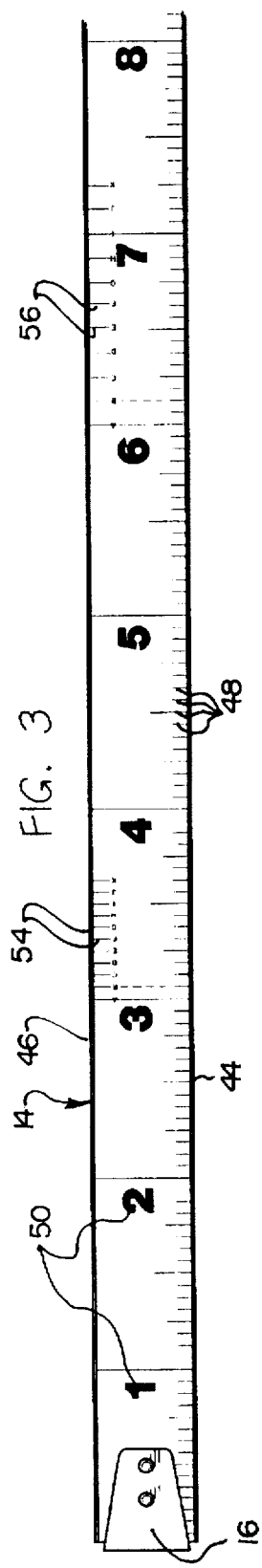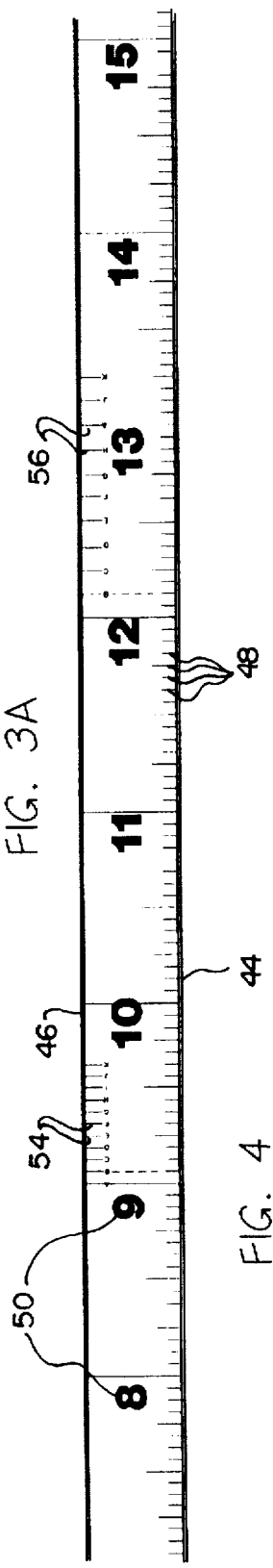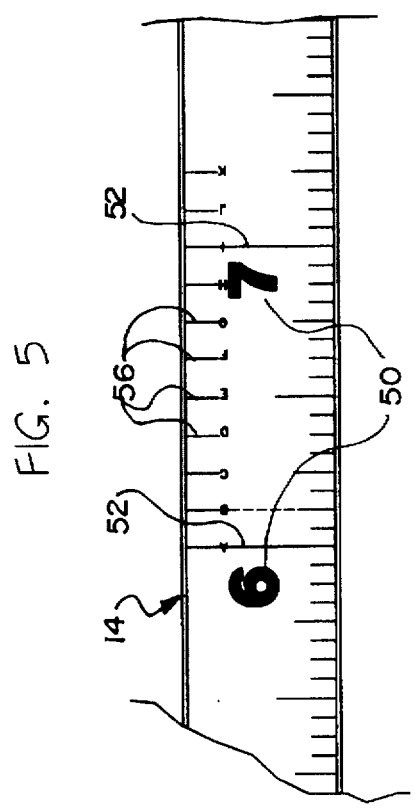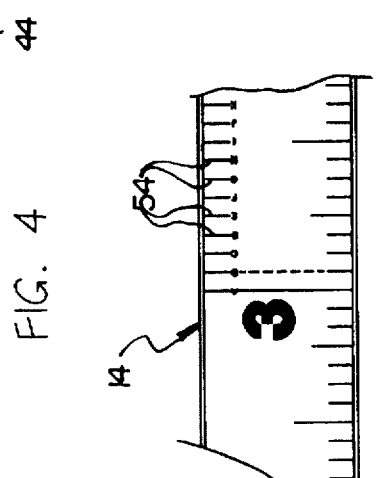

though the myriad of designs
BRICK MASON'S SPACING TAPE

BACKGROUND OF THE INVENTION

1. Field of the Invention

The present invention relates to a brick mason's spacing tape and more particularly pertains to utilizing the aligned increments adjacent each side edge of the tape to lay courses of brick.

2. Description of the Prior Art

The use of masonry guide devices is known in the prior art. More specifically, masonry guide devices heretofore devised and utilized for the purpose of assisting individuals in performing masonry related work are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 4,084,321 to Huston a mason's guide.

U.S. Pat. No. 4,995,167 to Sanchez discloses a masonry guide.

U.S. Pat. No. 3,422,539 to Schneider discloses a block or brick laying guide.

U.S. Pat. No. 3,484,943 to Yarbrough discloses a brick layer's gauge.

Lastly, U.S. Pat. No. 4,765,116 to Shank discloses a brick mason's spacer and method of using the spacer.

In this respect, the brick mason's spacing tape according to the present invention substantially departs from the conventional concepts and designs of the prior art, and in doing so provides an apparatus primarily developed for the purpose of utilizing the aligned increments adjacent each side edge of the tape to lay courses of brick.

Therefore, it can be appreciated that there exists a continuing need for a new and improved brick mason's spacing tape which can be used for utilizing the aligned increments adjacent each side edge of the tape to lay courses of brick. In this regard, the present invention substantially fulfills this need.

SUMMARY OF THE INVENTION

In view of the foregoing disadvantages inherent in the known types of masonry guide devices now present in the prior art, the present invention provides an improved brick mason's spacing tape. As such, the general purpose of the present invention, which will be described subsequently in greater detail, is to provide a new and improved brick mason's spacing tape and method which has all the advantages of the prior art and none of the disadvantages.

To attain this, the present invention essentially comprises a new and improved brick mason's spacing tape adapted for use in association with bricks and mortar, the apparatus comprising, in combination: a housing formed in a generally rectangular configuration with a front surface, a rear surface and an essentially hollow interior, the housing being divided into front and rear halves coupled together by a plurality of screws, the housing having a front side wall formed in a generally V-shaped configuration with an apex at it's center point, the front side wall having a lower extent with an aperture extending therethrough and into the hollow interior of the housing, the front side wall having an upper extent including a generally rectangular shaped slidable switch coupled thereto, the slidable switch including a plurality of grooves to provide a firm gripping surface for the user, the housing including tape rolling means operatively coupled to the switch, the rear surface of the housing including a generally inverted J-shaped belt clip affixed thereto, the belt clip having an outer segment including a circular aperture extending therethrough; a measuring tape formed in elongated planar rectangular configuration and measuring about ten feet in length, the tape having an outboard end including a hook member, the tape being linearly extendable from the housing in an operative orientation, the tape being rolled within the hollow interior of the housing and operatively coupled to the tape rolling means in a stored orientation, the tape having an upper surface with a first edge and a second edge, the first edge including numerical incremental line markers spaced 1/16 of an inch from each other, the first edge including inch demarcating numerals positioned at each one inch interval, long incremental line markers extending across the upper surface of the tape from the first edge to the second edge adjacent to each numeral; and the second edge of the tape including first and second groups of lettered incremental line markers, the first group of lettered markers commencing from the three inch demarcating numeral and repeating every six inches, the first group of lettered markers being spaced 1/16 of an inch from each other and positioned in alignment with the numerical incremental line markers of the first edge of the tape, the second group of lettered markers commencing from the six inch demarcating numeral and repeating every six inches, the second group of lettered markers being spaced 1/8 of an inch from each other and in alignment with every second numerical incremental line marker of the first edge of the tape, a user positioning the tape against a brick wall to aid in vertically or horizontally aligning bricks to be laid during construction of a brick structure.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved brick mason's spacing tape which has all of the advantages of the prior art masonry guide devices and none of the disadvantages.

It is another object of the present invention to provide a new and improved brick mason's spacing tape which may be easily and efficiently manufactured and marketed.

It is further object of the present invention to provide a new and improved brick mason's spacing tape which is of durable and reliable constructions.

An even further object of the present invention is to provide a new and improved brick mason's spacing tape which is susceptible of a low cost of manufacture with regard to both materials and labor, and which accordingly is then susceptible of low prices of sale to the consuming public, thereby making such brick mason's spacing tape economically available to the buying public.

Still yet another object of the present invention is to provide a new and improved brick mason's spacing tape which provides in the apparatuses and methods of the prior art some of the advantages thereof, while simultaneously overcoming some of the disadvantages normally associated therewith.

Still another object of the present invention is utilizing the aligned increments adjacent each side edge of the tape to lay courses of brick.

Lastly, it is an object of the present invention to provide a new and improved a brick mason's spacing tape adapted for use in association with bricks and mortar, the apparatus comprising: a measuring tape formed in an elongated planar configuration with an upper surface having a first edge and a second edge, the first edge including numerical incremental line markers spaced 1/16 of an inch from each other and inch demarcating numerals positioned at each one inch interval; and the second edge of the tape including at least two groups of lettered incremental line markers positioned at consistent intervals on the tape, each group of lettered markers repeating about every six inches, a first group of lettered markers being spaced 1/16 of an inch from each other and positioned in alignment with the numerical incremental line markers of the first edge of the tape, a second group of lettered markers repeating every six inches, the second group of lettered markers being spaced 1/8 of an inch from each other and in alignment with every second numerical incremental line marker of the first edge of the tape, a user positioning the tape against a brick wall to aid in vertically or horizontally aligning bricks to be laid during construction of a brick structure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a top perspective view of the measuring tape of the apparatus illustrating the first and second groups of right edge incremental markers.

FIG. 4 is an enlarged top perspective view of the measuring tape illustrating the first group of right edge incremental markers.

FIG. 5 is an enlarged top perspective view illustrating the second group of right edge incremental markers.

The same reference numerals refer to the same parts through the various Figures.

DESCRIPTION OF THE PREFERRED EMBODIMENT

Figure 1:
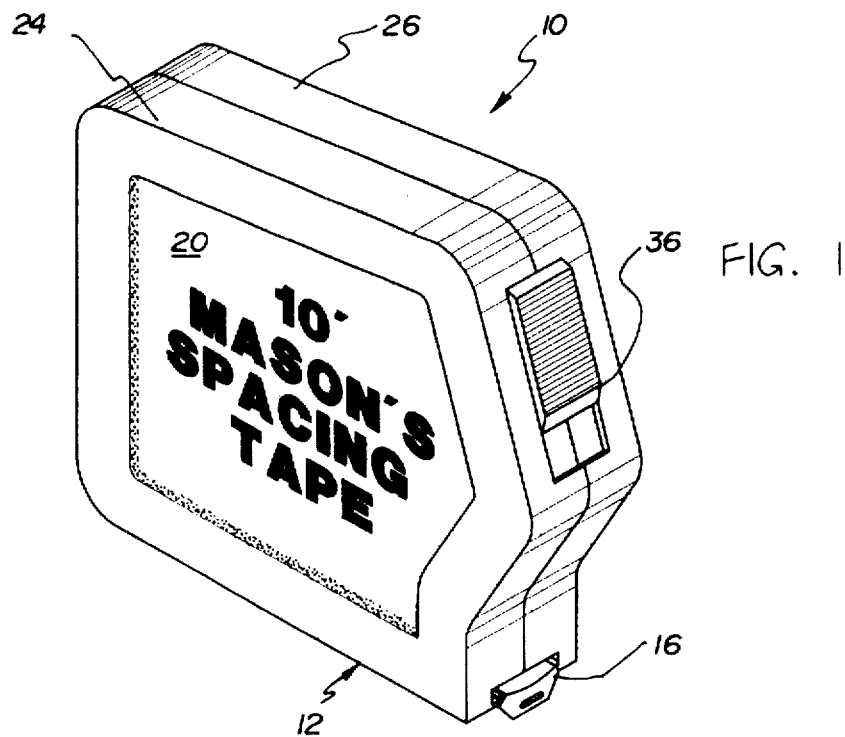
FIG. 1 is a perspective view of the preferred embodiment of the brick mason's spacing tape constructed in accordance with the principles of the present invention.

With reference now to the drawings, and in particular to FIG. 1 thereof, the preferred embodiment of the new and improved brick mason's spacing tape embodying the principles and concepts of the present invention and generally designated by the reference numeral 10 will be described.

The present invention, the brick mason's spacing tape 10 is comprised of a plurality of components. Such components in their broadest context include a housing 12, a measuring tape 14 and a hook member 16. Such components are individually configured and correlated with respect to each other so as to attain the desired objective. The brick mason's spacing tape 10 is adapted for use in association with bricks and mortar while constructing a brick structure such as a house, wall, fireplace, chimney, etc.

Figure 2:
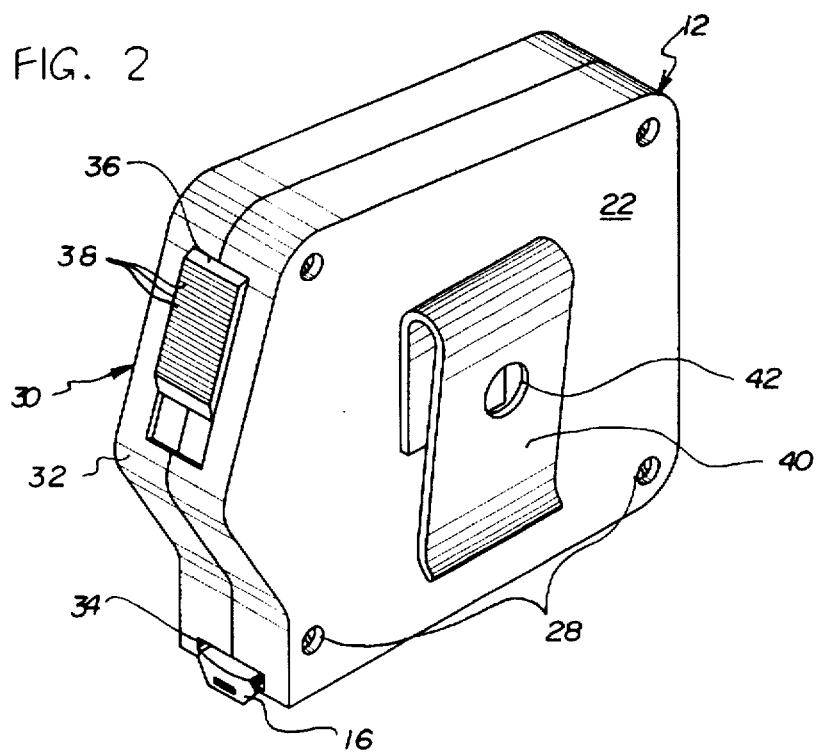
FIG. 2 is a rear perspective view of the housing illustrating the belt clip of the apparatus.

More specifically, the housing 12 is formed in a generally rectangular configuration with a front surface 20, a rear surface 22 and an essentially hollow interior. The housing is divided into front 24 and rear 26 halves which are coupled together by a plurality of screws 28. This configuration allows for easy repair of the apparatus when necessary. The housing has a front side wall 30 formed in a generally V-shaped configuration with an apex 32 at it's center point. In the preferred embodiment the portion of the V-shaped front wall is about one inch long. A ¼ inch vertical portion of the front wall connects the V-shaped portion to the floor of the housing. The roof and floor of the housing are 1¾ inches in length. The rear wall is 2¼ inches in height. Note FIGS. 1 and 2.

The front side wall has a lower extent with an aperture 34 extending through it and into the hollow interior of the housing. The front side wall has an upper extent which includes a generally rectangular shaped slidable switch 36 coupled to it. The switch is maneuverable in an upward or downward direction along the plane of the upper portion of the front wall. The switch is easily accessible to a user's thumb. The slidable switch includes a plurality of grooves 38 to provide a firm gripping surface for the user. Note FIGS. 1 and 2.

The housing includes tape rolling means which are operatively coupled to the switch. The rear surface of the housing includes an inverted generally J-shaped belt clip 40 affixed to it. The belt clip has an outer segment which includes a circular aperture 42 extending through it. The belt clip permits suspension from a user's belt or pocket. The circular aperture 42 permits suspension of the apparatus from a rope. Note FIGS. 1 and 2.

A measuring tape 14 is formed in elongated planar rectangular configuration and measures about ten feet in length. The tape has an outboard end which includes a hook member 16. The hook member is positioned around a brick or some other object when utilizing the apparatus. The tape is linearly extendable from the housing in an operative orientation. The tape is rolled within the hollow interior of the outer housing and operatively coupled to the tape rolling means in a stored orientation. Upon release of the tape it retracts within the hollow interior of the housing. Note FIGS. 1 and 2.

The tape has an upper surface with a first edge 44 and a second edge 46. The first edge including numerical incremental line markers 48 spaced 1/16 of an inch from each other. The first edge includes inch demarcating numerals 50 positioned at each one inch interval. Long incremental line markers 52 extend across the upper surface of the tape from the first edge to the second edge adjacent to each numeral. Note FIG. 3.

The second edge 46 of the tape includes first 54 and second 56 groups of lettered incremental line markers. The first group 54 of lettered markers commences from the three inch demarcating numeral and repeats every six inches. The first group of lettered markers is spaced 1/16 of an inch from each other and positioned in alignment with the numerical incremental line markers of the first edge of the tape. The first group of markers is used for aligning small bricks and measuring distances between bricks. Note FIGS. 3 and 4.

The second group 56 of lettered markers commences from the six inch demarcating numeral and repeats every six inches. The second group of lettered markers is spaced 1/8 of an inch from each other and in alignment with every second numerical incremental line marker of the first edge of the tape. The second group of markers is used for aligning large bricks. Note FIGS. 3 and 5.

When a user or mason desires to space out courses of brick he first retracts the tape from the housing. The user then positions the tape vertically against a brick wall. The next course or row of brick can then easily be laid by horizontally aligning the bricks with the markers on the right and left edges of the tape. The required spacing between columns of brick can also be easily determined by positioning the tape in a horizontal orientation and vertically aligning the markers with the vertical edges of the bricks. Mortar is used to permanently secure the bricks in place. Note FIGS. 3-5.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved brick mason's spacing tape adapted for use in association with bricks and mortar, the apparatus comprising, in combination:

a housing formed in a generally rectangular configuration with a front surface, a rear surface and an essentially hollow interior, the housing being divided into front and rear halves coupled together by a plurality of screws, the housing having a front side wall formed in a generally V-shaped configuration with an apex at it's center point, the front side wall having a lower extent with an aperture extending therethrough and into the hollow interior of the housing, the front side wall having an upper extent including a generally rectangular shaped slidable switch coupled thereto, the slidable switch including a plurality of grooves to provide a firm gripping surface for the user, the housing including tape rolling means operatively coupled to the switch, the rear surface of the housing including a generally inverted J-shaped belt clip affixed thereto, the belt clip having an outer segment including a circular aperture extending therethrough;

a measuring tape formed in elongated planar rectangular configuration and measuring about ten feet in length, the tape having an outboard end including a hook member, the tape being linearly extendable from the housing in an operative orientation, the tape being rolled within the hollow interior of the housing and operatively coupled to the tape rolling means in a stored orientation, the tape having an upper surface with a first edge and a second edge, the first edge including numerical incremental line markers spaced 1/16 of an inch from each other, the first edge including inch demarcating numerals positioned at each one inch interval, long incremental line markers extending across the upper surface of the tape from the first edge to the second edge adjacent to each numeral; and the second edge of the tape including first and second groups of lettered incremental line markers, the first group of lettered markers commencing from the three inch demarcating numeral and repeating every six inches, the first group of lettered markers being spaced 1/16 of an inch from each other and positioned in alignment with the numerical incremental line markers of the first edge of the tape, the first group of lettered markers assist with the alignment of small bricks along a receiving surface, the second group of lettered markers commencing from the six inch demarcating numeral and repeating every six inches, the second group of lettered markers being spaced 1/8 of an inch from each other and in alignment with every second numerical incremental line marker of the first edge of the tape, the second group of lettered markers assist with the alignment of large bricks along a receiving surface, the first group of lettered markers and the second group of lettered markers giving the measuring tape duality of use by allowing the user to measure small and large bricks respectively, a user positioning the tape against a brick wall to aid in vertically or horizontally aligning bricks to be laid during construction of a brick structure.

* * * * *